J. M. KELLOGG.
TRAP.
APPLICATION FILED AUG. 3, 1910.

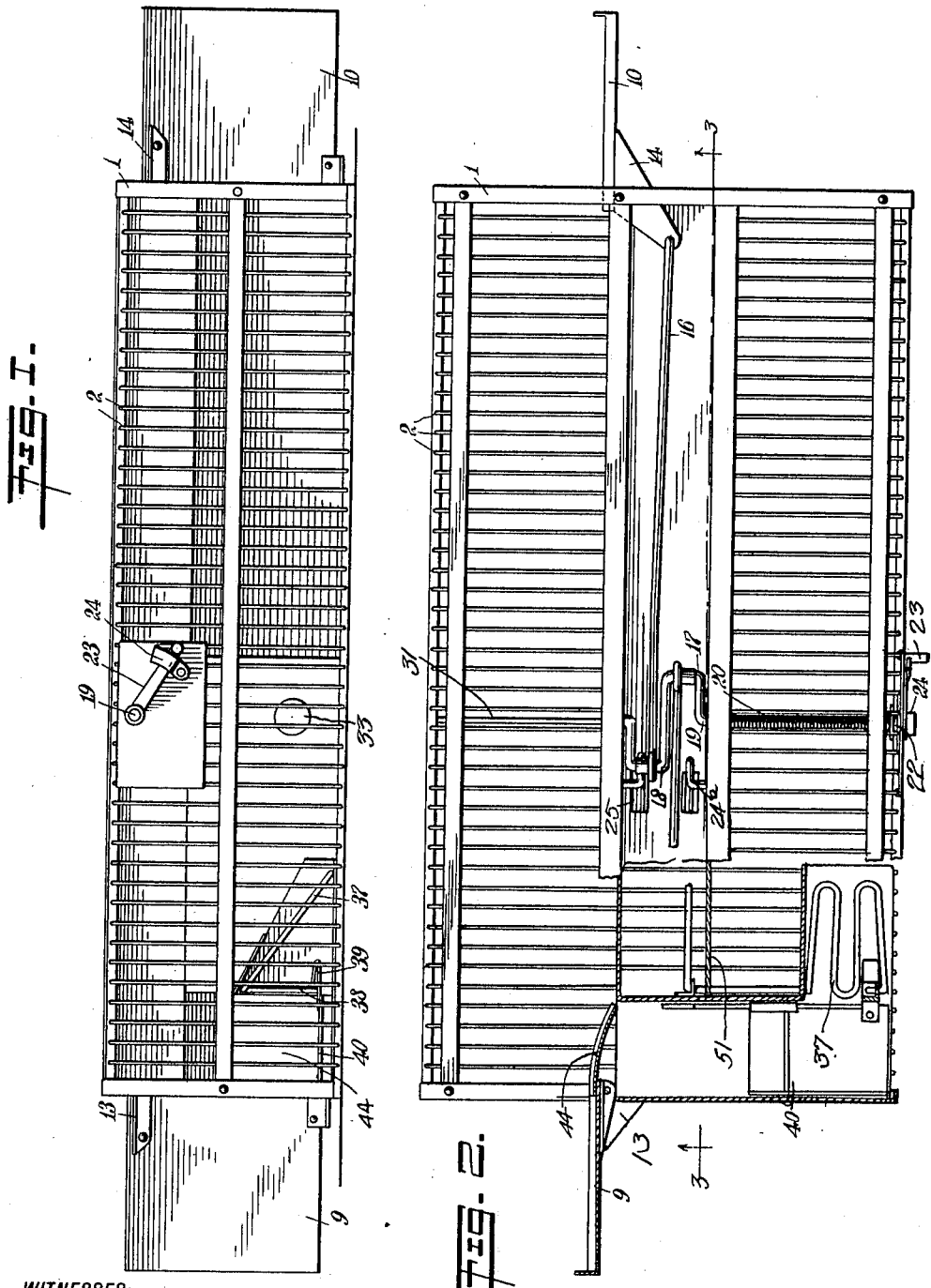

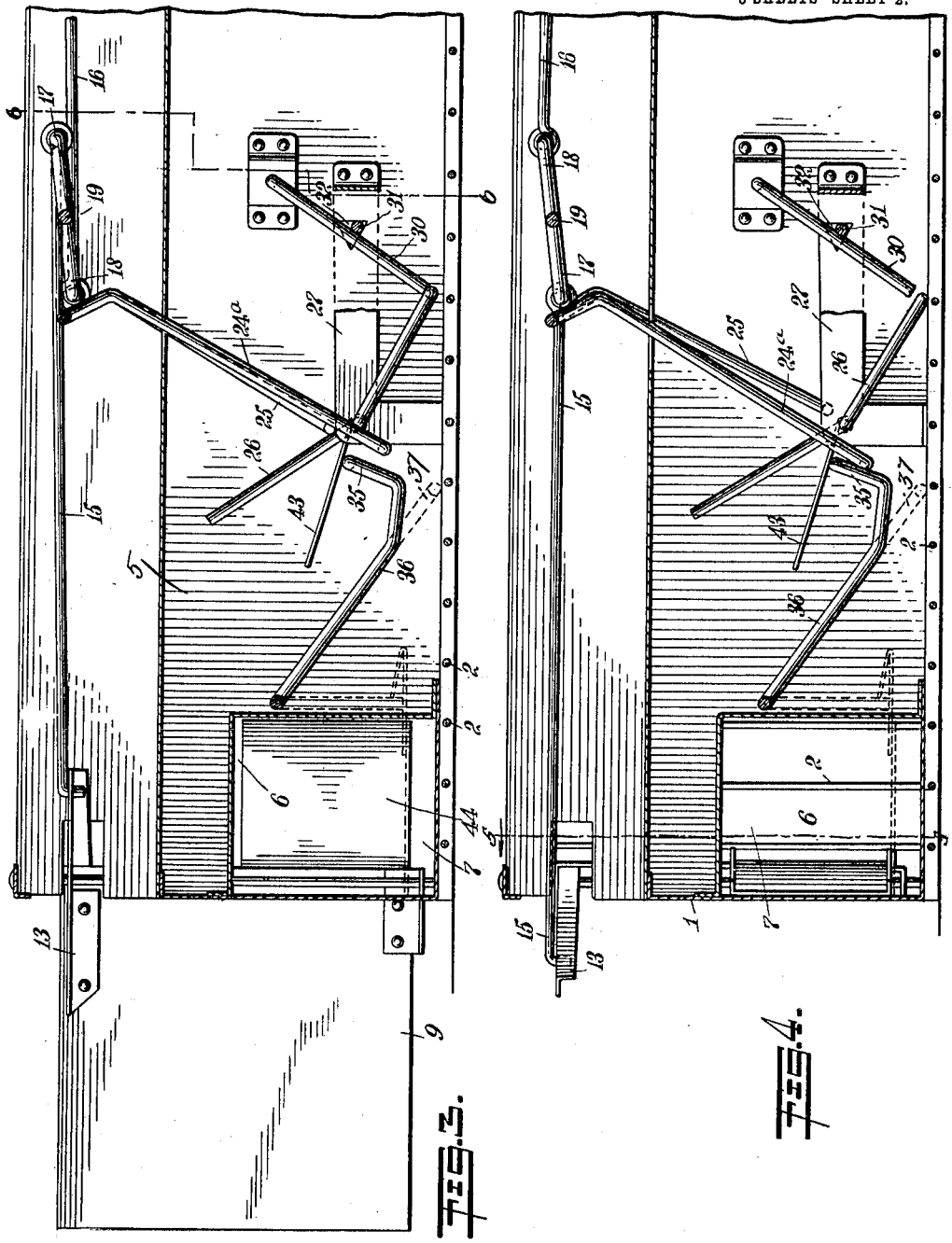

1,020,356.

Patented Mar. 12, 1912.
3 SHEETS—SHEET 3.

WITNESSES:
G. Robert Thomas
N. Whiting

INVENTOR
James M. Kellogg
BY
ATTORNEYS

UNITED STATES PATENT OFFICE.

JAMES MOSLEY KELLOGG, OF MUSCATINE, IOWA.

TRAP.

1,020,356. Specification of Letters Patent. Patented Mar. 12, 1912.

Application filed August 3, 1910. Serial No. 575,313.

*To all whom it may concern:*

Be it known that I, JAMES M. KELLOGG, a citizen of the United States, and a resident of Muscatine, in the county of Muscatine and State of Iowa, have invented a new and Improved Trap, of which the following is a full, clear, and exact description.

This invention relates to an animal trap for catching rats or other animals, and is of that type in which a plurality of animals may be caught successively, without the necessity of the intervention of a human agent for resetting the trap after each catch.

An object of this invention is to provide a device which will be simple in construction, inexpensive to manufacture, strong, durable, and positive in its operation.

A further object of this invention is to provide a trap with successive runways or compartments, in which an animal entering therein is automatically imprisoned and prevented from going back into the preceding compartment.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 5:
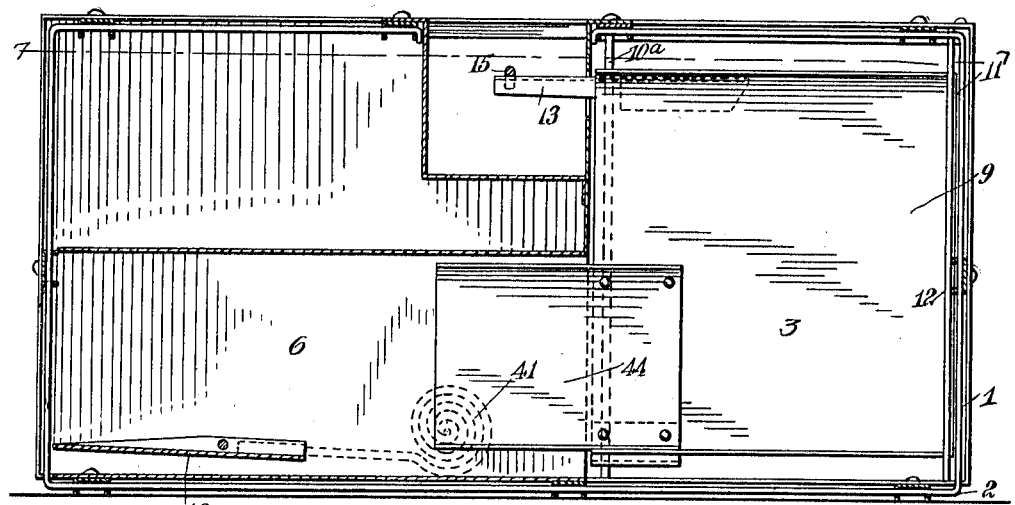
Figure 6:
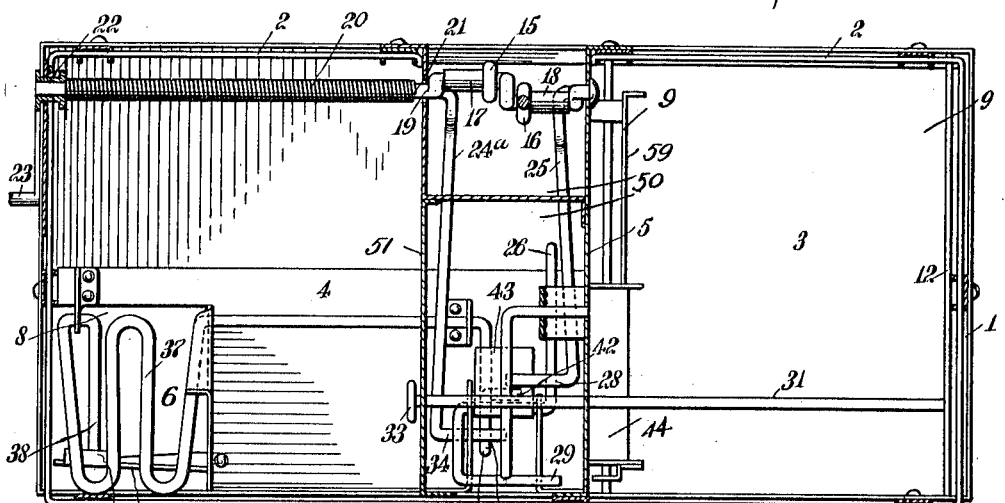
Figure 7:
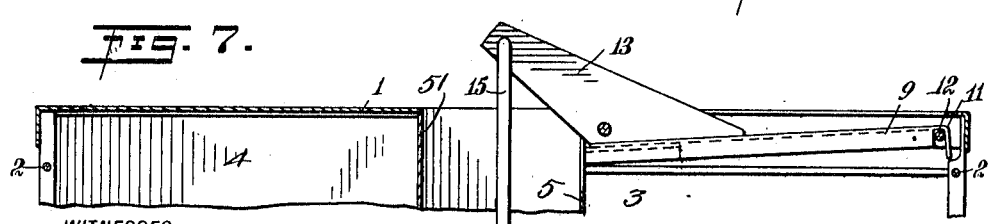

Figure 1 is a side view in elevation, showing the parts in the position in which the first compartment is open ready for the reception of a victim and with the second compartment closed. Fig. 2 is a top plan view, with the parts in the same position as in Fig. 1; Fig. 3 is an enlarged fragmentary longitudinal section on the line 3—3 of Fig. 2, showing the parts in the position in which the outer or first compartment is open and the second compartment closed; Fig. 4 is a view similar to Fig. 3, showing the first or outer compartment closed and the passageway from the first compartment to the second compartment open; Fig. 5 is a vertical transverse section on the line 5—5 of Fig. 4, showing the parts in the same position as illustrated in Fig. 4; Fig. 6 is a vertical transverse section on line 6—6 of Fig. 3; and Fig. 7 is a fragmentary horizontal section on line 7—7 of Fig. 5 showing one of the doors for the outer compartment closed.

Referring more particularly to the separate parts of the device, 1 indicates the body of the trap, which is formed preferably of strips of sheet metal having perforations therein, through which are threaded parallelly arranged wires 2, which form a cage-like inclosure. The inclosure is divided into a plurality of compartments 3 and 4 by means of a suitable partition 5, and which are connected by another compartment or passageway 6, so that they communicate one with the other. The passageway 6 has an opening 7, where it opens into the compartment 3 at one end, and also has an opening 8, where it lets out into the compartment 4. A portion of the compartment 4 is inclosed by a casing 51, forming chambers 50, in which the operating mechanism of the trap is protected. The first or outer compartment 3 is open at each end, and is provided with doors 9 and 10, which are preferably hung on shafts 10ª, so as to swing toward and from the openings. The outer end of each door, as clearly illustrated in Fig. 7, is provided with a hook 11, which is adapted to engage a vertical stop 12, whereby the inward or closing motion of the door is limited.

Extending from the doors 9 and 10, there are provided arms 13 and 14, which have perforations therein, so as to provide suitable sockets for down-turned ends of connecting links 15 and 16. These connecting links 15 and 16 are looped at their opposite ends around cranks 17 and 18 formed integrally on a horizontal shaft 19, which is pivoted in any well known manner to the body of the trap. By the rotation of the shaft 19 and the cranks 17 and 18, the doors 9 and 10 will be alternately opened and closed. In order that the rotation of the shaft 19 may be automatic, there is provided a spiral spring 20, which is coiled on the shaft 19 and secured thereto at 21, and secured to a collar 22 loose on the shaft 19 at the opposite end. The collar 22 is secured to a hand-crank 23, which extends outside of the body of the trap and is rotatably supported on the shaft 19, so as to wind up the spring 20.

In order to prevent the hand-crank 23 from springing back, there is provided a lock 24, in which the hand-crank is adapted to be slipped when the spring is wound up.

In order to prevent the shaft 19 from rotating and unwinding the spring 20 in a continuous manner, there are provided locks 24ª and 25, which are pivotally secured to the body of the frame, and are adapted to be engaged alternately by the cranks 17 and 18. These locks 24ª and 25 are pivoted and bent in the manner illustrated in Figs. 3 and 4, so that when engaged by the cranks 17 and 18, there is a tendency to swing the locks 24ª and 25 about their pivots, and thus release the cranks.

In order to prevent the lock 25 from rotating until the proper moment, there is provided a stop 26, which is in the form of a bell crank lever pivoted to an auxiliary frame 27, the upper arm of which is engaged by a flange 28 on the lock 25. The lower arm of the bell crank lever 26 extends downwardly and rearwardly, and is provided with a flange 29, which is engaged by a trip 30, so as to prevent its movement. The trip 30 is adapted to be operated by a tripper 31, which is loosely mounted in a triangular slot 32 in the partition 5 and the casing 51, and normally held in the lower corner thereof by a counterweight 33 formed thereon. The tripper 31 extends through the partition 5 into the compartment 3, where it is adapted to be operated by an animal in said compartment.

In order to prevent the lock 24ª from releasing the crank 17 until the proper moment, the lower end of said lock is provided with a flange 34, which is adapted to engage, as illustrated in Figs. 4 and 6, with an inclined member 35 on a stop 36. The stop 36 is adapted to swing vertically, so as to permit the flange 34 to slip under it, and thus permit the lock 24ª to swing, and the crank 17 to rotate through the half of a revolution. The stop 36 is connected to and preferably formed integral with a vertically swinging door 37, which is juxtaposed to the opening 8 so as to form a closure for the same. The door 37 is provided with a bar 38, which extends downwardly, and is adapted to be engaged by a latch 39 on a fall tread 40, which is pivotally connected to the body of the trap, and counterweighted beyond its pivot, as illustrated in the dotted lines in Fig. 5, at 41. The inclined member 35 is provided with a flange 42, shown in dotted lines in Fig. 6, which is adapted to engage a plate 43, pivotally connected to the bell crank stop 26, so that when the door 37 is raised, the plate 43 will also be raised, forming a means for pivotally forcing the lock 25 in a position where it will be ready to stop the crank 18 during the rotation of the latter. The door 9 is provided with a flap 44, which is so positioned that it will form a closure for the opening 7, and is adapted to swing into the compartment 6 when the doors 9 and 10 are closed, and is also adapted to swing out to close the opening 7 when the doors 9 and 10 are opened.

The operation of the device will be readily understood when taken in connection with the above description. The trap is set for operation by rotating the hand crank 23, so as to put a torsional strain on the spiral spring 20, thus causing it to constantly exert a tension, tending to rotate the shaft 19 and the cranks thereon in a left-handed or contraclockwise direction, viewed from the front of Figs. 1, 3 and 4. The trap is set with the doors 9 and 10 open, in the position indicated in Figs. 1 and 2, with the crank 18 engaging the lock 25, which is held from swinging from its locking position by the stop 26, which engages the trip 30. The tripper 31 which extends into the compartment 3 may be baited or not as desired. The animal, such as a rat or the like, will enter into the compartment 3, and either because the tripper 31 is baited, or by rushing against the same, the animal will jar the tripper 31, thereby causing the other end to swing up in the triangular slot 32, so that the trip 30 will be slipped off from the flange 29 on the stop 26. This will permit the lower end of the stop 26 to swing up, and the upper end to swing down, thereby allowing the lock 25 to swing toward the left, thus permitting the crank 18 and the shaft 19 to rotate under the power imparted thereto by the spring 20, until the crank 17 comes in engagement with the lock 24ª. Thus the doors 9 and 10 are swung to their closed position, simultaneously swinging the flap 44 into the compartment or passageway 6, opening the communication between the compartment 3 and the compartment 6. The animal caught in the compartment 3 is immediately disturbed by the noise of the closing of the doors 9 and 10, and rushes around trying to find an outlet. The only outlet from the compartment 3 which will appear will be the opening 7 into the compartment or passageway 6. The animal enters this compartment or passageway seeking an outlet. When he comes to the end of this passageway, his weight causes the fall tread 40 to drop against the action of the counterweight 41, thereby removing the latch 39 from engagement with the bar 38. The animal can then pass into the compartment 4 by raising the door 37. As soon as the animal starts to raise the door 37, the stop 36 is simultaneously raised, permitting the flange 34 on the lock 24ª to slip out under the end of the stop 36 and swinging to the left, thereby permitting the crank 17 to slip by the upper end of the lock 24ª and to rotate through half of a revolution, whereupon the crank 18 will come in contact with the lock 25, which has been previously thrown into a locking position by the flange 42 on the stop 36, swinging up the plate 43 which engages the flange 28 on the lower end of the lock 25. When this occurs, the rotation of the shaft 19, with the cranks connected thereto, immediately opens the doors 9 and 10, and simultaneously swings the flap 44 out across the opening 7, thereby cutting off the communication between the compartment 3 and the compartment or passageway 6, so that, if the animal has not already passed into the compartment 4, he has no other exit from the compartment 6 but into the compartment 4. When once into the compartment 4, the animal is positively prevented from exit from said compartment, as the door 37 will only open from the outside by releasing of the latch 39. The trap is thus set, ready for another animal to come in and trip the same, and go through the same process as the first one. The number of animals which can be caught in this way is almost unlimited, and depends on the strength of the spring 20, which will catch one animal and go through one complete circuit of operations for every turn of the crank 23.

Having thus described my invention, I claim as new and desire to secure by Letters Patent:—

1. In an animal trap, the combination with a compartment having a triangular slot in the side thereof, of a door for said compartment, a shaft, means for operatively connecting said shaft with said door, means for operating said shaft, a lock for preventing the rotation of said shaft, a stop for said lock, a trip for said stop, and a tripper loosely hung in said triangular slot in the side of said compartment, adapted to release said trap.

2. In an animal trap, the combination with an outer compartment, of an inner compartment, and an intermediate compartment connecting said outer compartment with said inner compartment, said outer compartment being open at each end, doors for closing said open ends of said outer compartment, a supplementary door secured to one of said doors and adapted to cut off communication between said outer compartment and said intermediate compartment when said first-mentioned doors are open, a crank shaft having a plurality of cranks thereon, connected to said first-mentioned doors, a spring secured at one end of said crank shaft, and means for winding the opposite end of said spring.

3. In an animal trap, the combination with an outer compartment, of an inner compartment and an intermediate compartment connecting said outer compartment with said inner compartment, said outer compartment being open at each end, doors for closing said open ends of said outer compartment, a supplementary door secured to one of said doors and adapted to cut off communication between said outer compartment and said intermediate compartment when said first-mentioned doors are open, a crank shaft having a plurality of cranks thereon, connected to said first-mentioned doors, a spring secured at one end of said crank shaft, means for winding the opposite end of said spring, an inclined door pivoted at its upper end and located in juxtaposition to the point of communication between said intermediate compartment and said inner compartment, a treadle located in said intermediate compartment, a latch on said treadle adapted to secure said last-mentioned door closed and adapted to be released by the weight of an animal on said treadle, means in said outer compartment adapted to release said crank shaft, and means connected with said last-mentioned door for controlling the operation of said crank shaft.

4. In an animal trap, the combination with an outer compartment, of an inner compartment and an intermediate compartment, said outer compartment being open at each end, doors for closing said open ends of said outer compartment, a supplementary door secured to one of said doors and adapted to cut off communication between said outer compartment and said intermediate compartment when said first-mentioned doors are open, a crank shaft having a plurality of cranks thereon, connected to said first-mentioned doors, a spring secured at one end of said crank shaft, means for winding the opposite end of said spring, an inclined door pivoted at its upper end and located in juxtaposition to the point of communication between said intermediate compartment and said inner compartment, a treadle located in said intermediate compartment, a latch on said treadle adapted to secure said last-mentioned door closed and adapted to be released by the weight of an animal on said treadle, a pair of locks adapted to alternately engage said cranks to prevent the movement of said crank shaft, means located in said outer compartment adapted to release one of said locks, and means connected to said door in said inner compartment, adapted to release the other of said locks.

5. In an animal trap, the combination with an outer compartment, of an inner compartment and an intermediate compartment connecting said outer compartment with said inner compartment, said outer compartment being open at each end, doors for closing said open ends of said outer compartment, a supplementary door secured to one of said doors and adapted to cut off communication between said outer compartment and said intermediate compartment when said first-mentioned doors are open, a crank shaft having a plurality of cranks thereon, connected to said first-mentioned doors, a spring secured at one end of said crank shaft, means for winding the opposite end of said spring, an inclined door pivoted at its upper end and located in juxtaposition to the point of communication between said intermediate compartment and said inner compartment, a treadle located in said intermediate compartment, a latch on said treadle adapted to secure said last-mentioned door closed and adapted to be released by the weight of an animal on said treadle, a pair of locks adapted to alternately engage said cranks to prevent the movement of said crank shaft, means for preventing the movement of one of said locks, a trip located in said outer compartment adapted to release said means, means for preventing the movement of the other of said locks, and a trip connected to said door in said inner compartment, adapted to release said last-mentioned means.

In testimony whereof I have signed my name to this specification in the presence of two subscribing witnesses.

JAMES MOSLEY KELLOGG.

Witnesses:
C. G. DALLAS,
E. F. RICHMON.

Copies of this patent may be obtained for five cents each, by addressing the "Commissioner of Patents, Washington, D. C."